(12) United States Patent
Konstantinovskiy

(10) Patent No.: US 7,810,420 B2
(45) Date of Patent: Oct. 12, 2010

(54) METHOD OF INTERRUPTING A TORNADO

(76) Inventor: Alexandr Konstantinovskiy, Kimrskiy Raion, Kalinin Street, dom 32., Kimry, Tverskaya Oblast (RU)

( * ) Notice: Subject to any disclaimer, the term of this patent is extended or adjusted under 35 U.S.C. 154(b) by 0 days.

(21) Appl. No.: 12/234,701

(22) Filed: Sep. 21, 2008

(65) Prior Publication Data

US 2010/0072296 A1    Mar. 25, 2010

(51) Int. Cl.
B64D 1/16        (2006.01)
A01G 15/00      (2006.01)

(52) U.S. Cl. .................. 89/1.11; 239/2.1; 239/14.1
(58) Field of Classification Search ............... 239/2.1, 239/14.1; 89/1.11
See application file for complete search history.

(56) References Cited

U.S. PATENT DOCUMENTS

| 4,126,972 | A |  | 11/1978 | Silen |
| 4,362,280 | A |  | 12/1982 | McCambridge |
| 6,056,203 | A | * | 5/2000 | Fukuta ..................... 239/2.2 |
| 2004/0226301 | A1 | * | 11/2004 | DuBrucq ................... 62/50.1 |
| 2007/0114298 | A1 | * | 5/2007 | O'Keefe .................... 239/2.1 |
| 2007/0158449 | A1 | * | 7/2007 | Hoffmann et al. ........... 239/2.1 |
| 2007/0158452 | A1 | * | 7/2007 | Hofffmann et al. ........ 239/14.1 |
| 2007/0214808 | A1 | * | 9/2007 | DuBrucq ..................... 62/64 |
| 2008/0283255 | A1 | * | 11/2008 | DuBrucq ...................... 169/5 |

FOREIGN PATENT DOCUMENTS

DE    10346788 A1 * 5/2005

OTHER PUBLICATIONS

Tornado, Wikipedia, http://en.wikipedia.org/wiki/Tornado, printed from the Internet Nov. 12, 2008, 36 pages.

* cited by examiner

*Primary Examiner*—Bret Hayes
(74) *Attorney, Agent, or Firm*—Alexey Bakman, Esq.

(57) ABSTRACT

The method of interrupting a tornado comprises the step of locating an area of ongoing tornadic activity. Ultra-cold substance is then released at low altitudes in the area of ongoing tornadic activity. In preferred embodiments, the ultra-cold substance is delivered to the area of ongoing tornadic activity by an airplane. The ultra-cold substance is preferably liquid nitrogen.

3 Claims, 1 Drawing Sheet

METHOD OF INTERRUPTING A TORNADO

FIELD OF THE INVENTION

The field of the present invention is methods of tornado protection and particularly a method of interrupting a tornado.

BACKGROUND OF THE INVENTION

Mankind has tamed many forces of nature, from mighty rivers harnessed in dams to tiny atoms vibrating in the confines of power stations. Yet tornadoes remain as wild, raw, and as terrifying a force, as it was thousands of years ago. Unlike hurricanes, tornadoes can not be reliably predicted and prepared for. There is no time to evacuate or put cardboard over the windows. Tornadoes strike suddenly, often at the time and place where they are least expected. In many cases, sudden onslaught of deadly winds leaves no time to hide in the shelter. And in most cases, there is no shelter to hide in, and human is left one on one with the fury of nature.

According to the US National Oceanographic and Atmospheric Administration, in an average year, 800 tornadoes are reported nationwide. These tornadoes reap the grizzly yearly harvest of 80 deaths and over 1,500 injuries in the United States alone.

The total number of tornadoes is likely much higher than the actual number reported. Scarce population of the Western states likely reduces the number of tornadoes noticed and reported. As the population of the United States steadily grows, so does the risk of each tornado. Furthermore, emerging evidence suggests that ongoing global warming is likely to cause more frequent and more violent tornadoes across the United States.

Although most tornadoes happen East of the Rocky Mountains, tornadoes have been recorded in nearly every state, except for Alaska. A risk of a damaging tornado is thus ever-present throughout the US. Tornadoes also pose great threat to life and property outside the United States and are known to occur in many areas, around the world, including densely populated areas, of India and Europe. Tornadoes are also common in southern Canada, throughout south-central and eastern Asia, east-central South America, Southern Africa, northwestern and southeast Europe, Italy, western and southeastern Australia, and New Zealand.

Tornadoes are capable of wind speeds of 250 mph or more and damaging paths of over a mile wide and 50 miles long. Such a tornado is likely to cause great damage to buildings and farmland, even if it were to happen over a sparsely populated territory. However, tornadoes are just as likely to occur over a densely-populated multi-million city as they are over the desert plains. If the tornado, such as the one described above made a mile-wide, 50-mile long path over a major city, the destruction of human life and infrastructure would be far more catastrophic than from the worst of hurricanes. Hurricanes can be predicted in advance. Preparations and evacuations for hurricanes can be made ahead of time. The nature of tornadoes does not allow for dryboarding of glass windows. Tornadoes are swift, unexpected, and deadly.

In recent decades, major scientific advances, such as Doppler radar helped scientists to identify, and in some cases even predict a tornado. However, the identification of an ongoing twister, or prediction of its appearance, minutes before the touchdown of the deadly funnel, does little to alleviate the danger posed by the tornado. At best, it may allow people, who are at home to hide in their shelters. However, the instant warning of an ongoing storm is unlikely to reach people who have their radios and TVs turned off. Even if people learn of the threat, it may already be too later, or there may not be a proper shelter nearby. And other than hiding in the shelter, if such a shelter exists at all, there is little that can be done by individuals or the government against a raging tornado.

The exact mechanics of tornado creation are still not fully understood. Several theories exist as to why and how these storms occur and are sustained for such long periods of time. In the absence of clear understanding of all the details of the phenomenon, the prior art offers few, if any solutions that would allow to actively prevent or interrupt a twister. Thus, if a major tornado, was heading toward a large city or a sensitive installation, such as a chemical stockpile, all a government could do is issue warnings, passively monitor the events and hope for the best.

Although major theories of tornado formation offer somewhat different interpretations of the details of storm's mechanism, they all agree on the major conditions required for a tornado to form. The most important condition is the collision of the warm and cold air. Thus uniformly warm or uniformly cold climates have few tornadoes, while areas like southeastern US, where warm air from the Caribbean and cool air from Canada collide, see the greatest number of tornadoes. Generally accepted theories of tornado formation state that it is the interaction of the warm and cold air that creates the driving force for a tornado.

In the United States, for example, the warm moist air, just above the ground coming from the Gulf and/or heated by the surface of the earth has a general upward motion. At the same time the cold dry Arctic air brought in by the cold fronts has a general downward motion. These upward and downward motions of the fronts accelerate tremendously in each other's presence, with warm air streaming upwards at great speed and cold air falling down. Naturally, this rapid redistribution of air masses is accompanied by violent winds and lightning. As warm moist air is rapidly cooled, voluminous precipitation, often in the form of large hail, bombards the ground. Initially, this interaction of rising warm air and falling cold air may create a horizontal spinning effect in lower atmosphere. According to the theory of tornado formation set forth in the National Weather Service Tornado Preparedness Guide, rising air within the thunderstorm updraft may tilt the rotating air from horizontal to vertical, creating a rotating wall cloud, which, upon touchdown with earth becomes a tornado.

It is suspected that in many types of tornadoes (or tornado-like storms), touchdown with the earth begins when increasing rainfall drags with it an area of quickly descending air, known as rear flank downdraft (RFD). This RFD drags the rotating air toward ground with it. This rotating air often takes the form of a visible funnel as it approaches the ground, and as the winds kick up dust and debris that are pulled into the funnel. It is now a full-blown tornado.

Initially, the tornado has a good source of warm moist inflow to power it. The areas of such inflow can be observed by doppler radar and can otherwise be recognized by meteorologists. As long as such an inflow exists, the tornado can, sustain itself, and even grow and continue its destructive path. This destructive phase can last for minutes or hours.

While the tornado rages on the ground, the RFD becomes an area of cool surface winds. As this area of cool air expands around the tornado, it eventually cuts off the inflow of warm moist air that powers the tornado. Warm air feeds the tornado, much like oxygen feeds fire in a stove. Once the supply of warm air is interrupted, or once the tornado "sucks in" the cool air brought down by RFD instead of the warm air, the system begins to "choke." The tornado rapidly loses power, and often becomes thin and rope-like. As tornado begins to dissipate, as its rotation is interrupted, so is the rotation of the mesocyclone, associated with the tornado. Once the tornado dies off, its mesocyclone often disappears, or is greatly weakened.

This cycle of cold-warm air interaction, or variations thereof, are generally associated with most tornadoes and tornado-like circulations, and certainly the most powerful tornados. Many fine details of tornado life cycle and formation still remain a mystery, though.

There is a reason why to this day tornadoes and tornado-like storms remain some of the least understood natural phenomenons. The collision of warm and cold fronts, by itself is not sufficient to bring about the destructive powers of a twister. In most cases, such a collision creates rains and thunderstorms, nothing more. Only in very rare cases do tornadoes occur out of thunderstorms. The creation and sustainment of a tornado, requires precise interrelation of a multitude of factors and mechanisms, many of which are still not fully understood by science. Most likely, in different types of tornadoes (multiple-vortex, satellite, waterspout, landspout, etc.) and tornado-like circulations, somewhat different factors and mechanisms are at play. But it is clear that the violent powers of a tornado are borne out of an equilibrium, a delicate balance of forces of nature that come together at the same time, in exact proportions required to sustain a twister.

The complexity of interrelation of all the factors required for a tornado explains why tornadoes often appear suddenly without a warning, when all of the required factors come together. It also explains the sudden disappearance of even the most powerful twisters. Tornadoes and tornado-like circulations are not stable. Instead, they are some of the most fragile natural phenomena. It must thus be possible to affect at least one of the variables of this fragile equilibrium to disrupt the beautiful and deadly force. The present invention offers one way of interrupting the deadly march of a tornado or any tornado-like circulation.

Most past inventions in the art of tornado safety mostly involve the improvements in detection, warning, and protection against the storms. The protection against tornadoes mostly involves the design of better and stronger shelters.

An attempt to mechanically reduce the destructive effects of tornados was described in one of the US patents. The invention offered an intricate machine, a special propeller, referred to as fluid dynamic converter. This propeller or propellers were intended for insertion into the rotating columns of air inside a tornado. The fluid dynamic converters were supposed to mechanically impart a rotary motion to a column of air in the direction opposite to the rotation inside a tornado. In a sense, the invention offered to counteract the force of nature with a mechanical force of a man-made machine. Assuming that such a machine may theoretically be effective against some tornados, the size, power and costs of the machine required to achieve any effect against a full-blown tornado, as well as the difficulties associated with the instant availability of such machines in the area of the storm, combined with the transport and safety issues associated with transporting such a machine into and out of the tornado, make this approach far less than ideal.

However, total lack of any options for action in response to a tornado, combined with unreliable prediction and warning, is an even worse approach. Today, there is nothing that any government can do in response to a tornado that rages for hours and is moving toward a chemical factory, or a densely-populated city, threatening millions of lives. Therefore, a method of actively counteracting, or "extinguishing" tornadoes is required in the art. Such a method must be applicable to a broad range of tornadoes and tornado-like storms and be implementable on short notice in locations prone to the threat. The method must not be excessively expensive or dangerous to carry out. The method of present invention achieves all of these objectives and provides various additional benefits.

SUMMARY OF THE PRESENT INVENTION

The present invention is defined by the following claims and nothing in this section should be taken as a limitation on those claims.

The invention describes and claims a method of interrupting a tornado. As the first step, an area of ongoing tornadic activity is located. Ultra-cold substance is then released at low altitudes in the area of ongoing tornadic activity. The ultra-cold substance is preferably liquid nitrogen.

In some preferred embodiments of the present invention, the ultra-cold substance is released at low altitudes directly into the rotating tornado funnel.

The method of the invention anticipates cases where the area of ongoing tornadic activity comprises at least one tornado traveling in horizontal direction over the ground. For such cases, the invention discloses the method of releasing the ultra-cold substance at low altitudes in front of the tornado, on a predicted tornado path.

Another preferred embodiment of the method comprises the step of identifying an area of warm-air inflow to the tornado. After such area is identified, the ultra-cold substance is released in the area of warm-air inflow to the tornado. This uptake causes the tornado to take up the ultra-cold substance and cooled air. The uptake of colder air and/or ultra-cold substance interferes with equilibrium that sustains the tornado.

In preferred embodiments the ultra-cold substance is delivered to the area of ongoing tornadic activity by an airplane. In one preferred embodiment, the ultra-cold substance is dropped from the airplane in containers. The ultra-cold substance is then released from these containers at low altitudes. The ultra-cold substance may also be released into tornado directly from the airplane. Alternatively, the airplane (a drone) comprising the ultra cold substance is remotely guided into the tornado at low altitudes. Once inside a tornado, the airplane explodes or otherwise opens up, thereby releasing the ultra-cold substance into the tornado.

A method of interrupting a tornado by detonating an explosive at low altitude in the area of ongoing tornadic activity is also described and claimed.

DETAILED DESCRIPTION OF THE PREFERRED EMBODIMENTS

Figure 1:
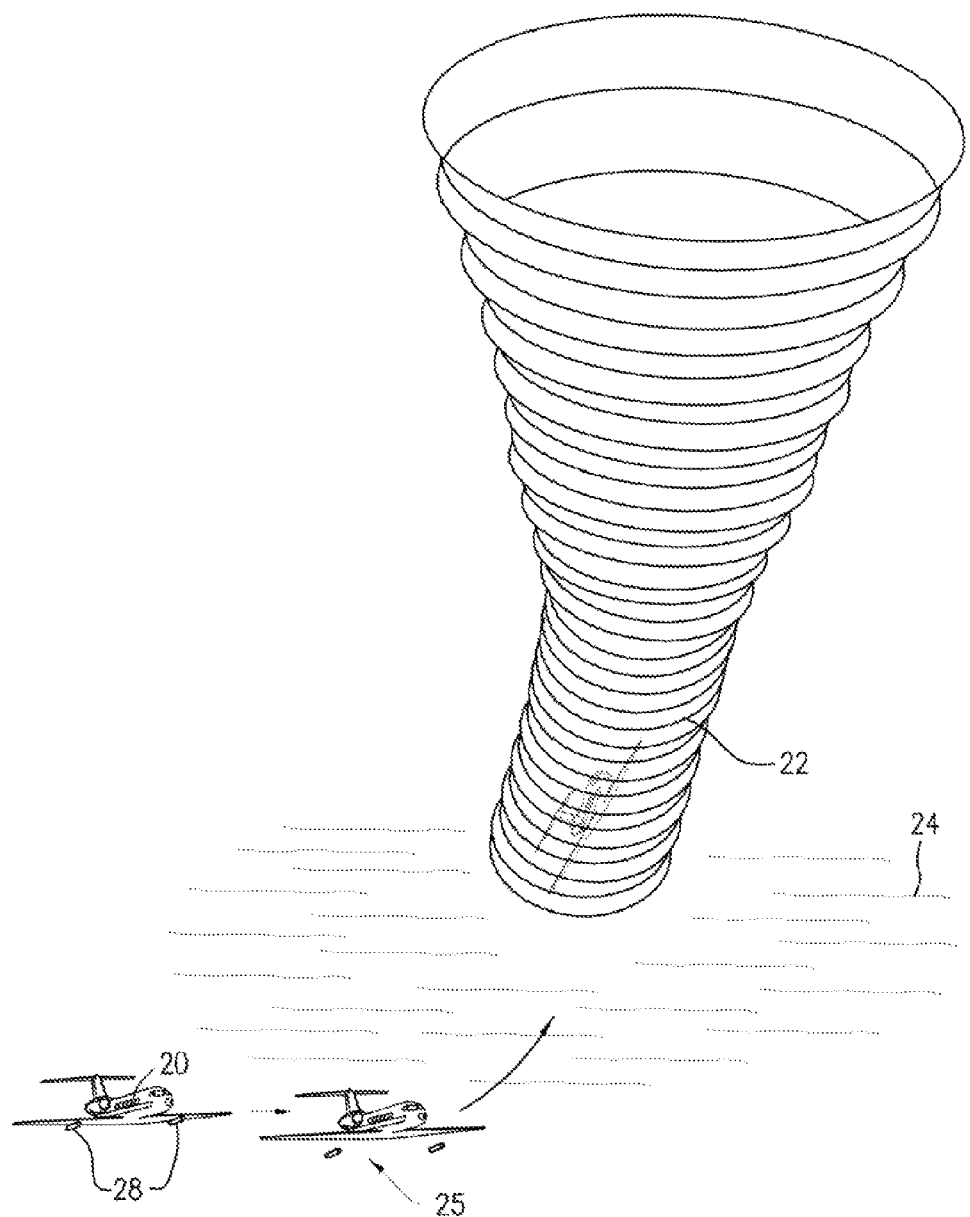
FIG. 1 illustrates one of the preferred embodiments, where the ultra-cold substance is delivered to the area of ongoing tornadic activity by a remotely-controlled drone airplane.

The method of the present invention will now be illustrated with references to the accompanying drawing.

The present invention is directed to a method of interrupting and preventing a tornado. The method is aimed at interfering with the equilibrium of the forces of nature (i.e., environmental factors, such as the temperature, pressure and wind direction) required for the formation and sustainment of the tornado.

The term tornado, as used in this description and the claims is a broad term, referring to a naturally-occurring, violently rotating column of air. The description of the preferred embodiments below, discusses the application of the method in reference to the powerful storms, traditionally associated with the term "tornado." That is, the rotations pendant from or underneath a cumuliform cloud or a mesocyclone. However, the term "tornado," as used in this description and the claims also refers to numerous types of tornados and tornado-like circulations, such as waterspouts, landspouts, gustnados, dust devils, winter waterspouts and fire whirls, among others. Such other types of tornados and tornado-like circulations also depend on the fragile balance of the multitude of environmental factors and can be disbalanced and disrupted by the methods of the present invention.

As described above, the tornadoes are powered by the inflow of warm moist air that powers the tornado. Once the supply of warm air is interrupted, or once the tornado "sucks in" the cool air, brought down by rear flank downdraft, instead of the warm air, the system begins to "choke." In nature, it may take anywhere from several minutes to many hours until the tornado becomes surrounded by the cold air on all sides and "chokes." As tornado moves along the ground, it may, in a sense, be running away from low-altitude cold air, acquiring new sources of warm moist inflow.

The method of the present invention proposes the interruption of the tornado by changing the temperature in the area of ongoing tornadic activity. Preferably the change is comprised of cooling the air at low altitudes in the area of ongoing tornadic activity. The change in temperature is likely to have a two-pronged effect.

First, the cold air, as it is taken in by the tornado at low altitudes, instead of the warm air, interferes with the temperature balance sustaining the tornado. Instead of the warm air naturally rising and driving the tornado, tornado will be forced to suck in and lift (in many cases all the way up into the mesocyclone), the heavier cold air, which tends to stay low. As tornado's loses its warm-air supply/fuel and is forced to work in raising up the cold air, it will instantly enter the dissipating stage and extinguish in a way similar to the fire extinguishing from the lack of oxygen. Even in cases where the air in the area of ongoing tornadic activity is not cooled enough to instantly extinguish the tornado (or where the tornado is very large), cold air intake is likely to weaken/slow the tornado. As the tornado is weakened and/or as its ground speed and direction changes, even if temporarily, in response to the cold air intake, chances increase for a naturally descending and expanding cold air (such as the air brought down by the rear flank downdraft) to surround and naturally "choke" the tornado. Thus, even if the method of the present invention does not immediately terminate the tornado, it will greatly increase the chances of tornado entering into the dissipating stage by itself.

Second, rapid low-altitude cooling of air in the area of ongoing tornadic activity is likely to trigger a number of changes in atmospheric conditions in the area. The direction and intensity of air-flow streams may change, for example. Rapid precipitation, and/or a number of other atmospheric changes are likely to occur, with each change triggering a chain of other changes in the immediate environment. As described above, tornadoes are fragile phenomena. Rapidly changing conditions in the area of ongoing tornadic activity will disrupt the equilibrium of forces sustaining the tornado, thus terminating the twister.

In the preferred embodiment of the present method, the first step requires locating an area of ongoing tornadic activity. The area of ongoing tornadic activity refers to the area, with at least one ongoing tornado, or an area where tornadoes are likely to appear. The latter may be characterized (among other things) by the presence of a mesocyclone, particularly if the mesocyclone that already previously spawned tornadoes, or he presence of other conditions suggestive of tornado formation. The methods of locating and/or predicting an area of tornadic activity are well known to those skilled in the art of meteorology and/or involved in issuance of tornado warnings. Such areas may be identified by eyewitness reports, detected by Doppler radars, calculated in computer simulations, etc. For example, eyewitnesses may report an ongoing tornado or a mesocyclone with large rotating masses of air in the form of funnels, wedges, stovepipe, etc. Such reports may be a warning of potential tornadoes that have not yet made the touchdown with the ground. If tornadoes in that area are deemed dangerous enough, arrangements must be made for interrupting or preventing a tornado by releasing an ultra-cold substance at low altitude in the area of ongoing tornadic activity.

The term ultra-cold substance 20 refers to substances, preferably liquids or gases, that are either very cold, or are capable (through chemical reaction or otherwise) of rapidly cooling the materials (such as ground or air) that they come in contact with. In the preferred embodiments a liquified gas, such as liquid nitrogen or liquid helium is used as the "ultra-cold substance". Preferably, the ultra-cold substance in not flammable. Liquid nitrogen is the preferred ultra-cold substance due to its very low cost (under $0.1/liter), boiling point of −196 degrees Celsius (77 K, −320 F) and low reactivity and flammability. Nitrogen is also environmentally friendly, with 78 percent of earth's atmosphere consisting of nitrogen. Thus, the release of large quantities of nitrogen will have little, if any long-term environmental effects.

In preferred embodiments, the ultra-cold substance is delivered to the area of ongoing (or likely) tornadic activity by an airplane. The airplane may be piloted by a human pilot. However, considering the dangers of airplane operations in the area of colliding fronts and tornadic activity, it would be safer if the airplane delivering the ultra-cold substance is a drone 25, controlled from a safe location.

The ultra-cold substance contained inside of the plane may be packaged into one large container or a number of smaller containers. For example, in one preferred embodiment, the ultra-cold substance is releasably contained in at least one, and preferably a plurality of containers on board of the plane, or attached to the external surfaces of the plane. The airplane best suited for such an embodiment is a large bomber aircraft (such as B-52 bomber) or a transport aircraft. The ultra-cold substance is dropped from the airplane in containers.

The containers, releasably containing the ultra-cold substance are preferably designed to release the ultra-cold substance at low altitudes. That is, the containers may be designed to be breakable-upon-impact, so as to release the ultra-cold substance upon impact with the ground. Alternatively, the containers may comprise altimeters and/or be remotely controlled to explode and/or release the ultra-cold substance at a pre-determined altitude. In some embodiments, the containers may be shaped as, and may in fact be chemical bombs of an existing design, except releasing the ultra-cold substance instead of the anti-personnel chemicals. The containers/bombs may also be smart bombs, or even cruise missiles, guidable to the exact position of desirable ultra-cold-substance release using presets, cameras, remote controls, sensing equipment, GPS, etc.

In preferred embodiments, the position of desirable ultra-cold-substance release is at low altitudes in order to effect the most damaging, lower rotating portion of the tornado. If the tornado is in contact with the ground, and takes in air and debris from the ground surface, then it may be effective to release the ultra-cold substance as close to the ground level as possible, so that the lower rotating portion of the tornado will "suck in" the ultra-cold substance and/or the air cooled by the ultra-cold substance instead of the warm moist air that feeds it.

Similar approach is used in some other preferred embodiments. In such embodiments, the area of ongoing tornadic activity comprises at least one tornado. The area of warm-air inflow to the tornado is identified. The identification may be by the means of the Doppler radar, infrared cameras, or other methods to distinguish cold and warm air flow, known in relevant art. The ultra-cold substance is then released in the area of warm-air inflow to the tornado, in order to cause the tornado to take up the ultra-cold substance and cooled air, thus interfering with equilibrium that sustains the tornado. For example, in such embodiments of the present method, the area of the warm-air inflow may be identified to be 20-40 meters off the ground, to the left side of the tornado funnel. In this case, it would be most advantageous to release the ultra-cold substance at the identified height of 20-40 meters (30 meters, for example), to the left side of the tornado funnel. If the tornado has not yet fully formed (that is, the column of rotating air is not in contact with the ground yet), but the area of the warm-air inflow can be identified, ultra-cold substance may be released in this area of warm-air inflow (even if it's well above the ground) to interrupt the rotating streams from becoming a full-blown tornado.

In other preferred embodiments of the method, where the area of ongoing tornadic activity comprises at least one tornado, with rotating tornado funnel 22, the ultra-cold substance is released at low altitudes directly into the rotating tornado funnel 22. In this embodiment, containers with ultra-cold substance may be dropped from above or guided directly into the rotating funnel of the tornado. Once inside the funnel, the containers explode (or otherwise open up) and ultra-cold substance is released, interfering with temperature balance and other equilibriums inside the tornado.

In another preferred embodiment of the method, the ultra-cold substance is released at low altitudes in front of the tornado, on a predicted tornado path. In this embodiment the area of ongoing tornadic activity comprises at least one tornado traveling in horizontal direction over the ground, as most tornadoes do. The movement of the tornado over the surface is generally visible with a naked eye. The pilots of the airplane, carrying the ultra-cold substance or ground observers will in most instances be able to observe the direction and speed of the tornado movement and generally predict where it will be in the next minute or two, and where the ultra-cold substance should be released. This approach, in a sense sets up cold air patch trap (or traps) on the path of the tornado. As, the tornado moving along its natural path gets into/gets surrounded by the cold patch, the inflow of warm air will dwindle or lessen. Rapid cooling is also likely to change other atmospheric conditions in the area, disrupting the equilibrium of conditions sustaining the tornado. The release of ultra-cold substance in front of the tornado may be particularly advantageous in situations where it is impossible to quickly an reliably determine the area of warm-air inflow into the tornado, or where it is technically impractical or dangerous to release the ultra-cold substance into the area of warm-air inflow. For example, even if area of warm-air inflow is known, the amount of debris falling into the area may prevent an airplane from approaching the area.

The ultra-cold substance may be released from the containers or bombs dropped from the airplanes, as well as by other methods. For example in one embodiment, the ultra-cold substance is released directly from the airplane. A crop-duster type of airplane or fire-extinguishing airplane, capable of dumping large amounts of liquid are most suitable for such release the ultra-cold substance directly from the airplane. Fire-fighter planes are likely to be more efficient for this purpose, as they are capable of releasing large quantities of liquids instantaneously. Such crop-duster or fire-fighting airplanes may be used to create cold patch traps, as described above, or to release the ultra-cold substance into the warm-air inflow area, if safety considerations and atmospheric conditions allow.

In other embodiments, cold traps may be preset on the ground, especially around the sensitive buildings and installations and released if tornado approaches. For example, canisters containing the ultra-cold substance may be set up around perimeter of a nuclear power station, or a military installation. If a tornado approaches and threatens such a sensitive installation, the canisters are remotely activated to release the substance, thus setting cold-air tornado traps. The canisters used for this purpose may be truck cisterns, filled with ultra-cold substance. If the topography allows, such mobile truck cisterns, mounted on trucks provide flexibility in arranging the cisterns (at a particular distance, in particular formation, location and proximity to each other) in response to the approaching tornado.

Another preferred embodiment, of the delivery of the ultra-cold substance is shown on FIG. 1. The image shows at least one tornado funnel 22 in contact with the ground 24. In this embodiment the ultra-cold substance is also delivered to the area of ongoing tornadic activity by a remotely-controlled drone airplane 25 (or drone 25). The drone 25, comprising one or more canisters with ultra-cold substance is guided into the tornado (i.e. the tornado funnel 22) at low altitudes. Once inside the tornado, the drone 25 is intentionally exploded or otherwise broken up therein, thereby releasing the ultra-cold substance into the tornado. The explosion/breakup of the drone inside of the tornado may be caused by a remotely-sent signal or by the signal of the gyroscope or other sensors inside of the drone, indicating that it is inside a tornado.

In order to reduce the costs, preferably, the drones 25 used to deliver the ultra-cold substance into the tornado and exploded therein are old decommissioned passenger, cargo, or military planes, modified into remotely-controlled drones.

In order to minimize environmental damage and the intensity and the release of heat from the explosion of the airplane inside a tornado, it is preferable that the drone 25 be powered from detachable gas tanks 28. Such tanks preferably detach from the drone 25 and drop to the ground before the drone enters the tornado. Alternatively, the tanks detach once the plane is inside of the tornado, but some time before the explosion/break-up takes place.

The amount of ultra-cold substance that is required to interfere with a tornado is situation-specific and will depend on such characteristics as the size of the tornado, the type and temperature of the ultra-cold substance. It is expected that tens of tons (20 tons, for example) of liquid nitrogen (or other ultra-cold substance) released inside of a tornado funnel are sufficient to terminate a medium to large-sized tornado with a high degree of certainty. However, the release of much smaller amounts of the ultra-cold substance may prove to be effective for termination of many tornadoes, and particularly in effecting tornado's path, or initiating a chain of atmospheric reactions that will destabilize a tornado and expedite tornado's entry into a dissipation stage.

The present invention also anticipates a method of preventing a tornado, where the tornado comprises a tornadic funnel, and where the tornadic funnel has not descended sufficiently to touch down with ground yet. In such cases, the release of an ultra-cold substance in the area of ongoing tornadic activity may prevent the tornado from touching down with the ground at all. Similarly to the methods described below, the ultra-cold substance may be released directly into the lower end of the tornadic funnel (preferably), directly under the tornadic funnel, into the area or warm air inflow, so that the ultra-cold substance and the surroundings air cooled by it would interfere with the equilibrium sustaining the tornado. The delivery methods are the same as in the embodiments described above.

Alternative embodiments of the present invention also anticipate the use of methods of tornado-disruption other than the release of the ultra-cold substance or in combination with the release of the ultra-cold substance. Thus, in one alternative embodiment an explosive is detonated at low altitude in the area of ongoing tornadic activity. Preferably, the explosive is detonated in close proximity to or inside of the tornado funnel. Preferably, the explosive is a thermobaric weapon. A powerful explosion in the area of tornadic activity is likely to have an effect on atmospheric conditions in the area, causing local changes in pressure and temperature, for example. Local wind changes will occur. The blast wave is likely to cause smaller short-lived whirls of air alongside the main tornado. These radical local changes are likely to throw off the temperature, pressure and air inflow balance (among others) and destabilize the gentle atmospheric balance sustaining a twister. Even in the unlikely event that the tornado survives a powerful blast, changed atmospheric conditions are likely to at least cause the tornado to change its path. Changing tornado's path may be critical in protecting critical infrastructure and/or densely populated areas. The detonation of explosives may be used by itself or, for increased effect, in combination with the release of the ultra-cold substance to alter the local atmospheric conditions and interrupt a tornado.

It is to be understood that while the apparatus and method of this invention have been described and illustrated in detail, the above-described embodiments are simply illustrative of the principles of the invention and the forms that the invention can take, and not a definition of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

I claim:

1. A method of interrupting a tornado of the type, where rotation is sustained by the temperature differences at different altitudes, comprising the steps of:
   a. locating an area of ongoing tornadic activity; wherein the area of ongoing tornadic activity comprises at least one tornado, the tornado comprising a rotating tornado funnel,
   b. releasing an ultra-cold substance at low altitude in the area of ongoing tornadic activity,
   c. wherein the low-altitude is the altitude corresponding to a lower rotating portion of a particular tornado being targeted, and wherein the low-altitude is the altitude at which warm-air intake of a particular tornado being targeted is likely to occur,
   d. and wherein the ultra-cold substance is contained in a container and is released from the container by instantaneous breakup of the container,
   wherein the area of ongoing tornadic activity comprises at least one tornado, and further comprising the steps of:
   e. identifying an area of warm-air inflow to the tornado,
   f. releasing the ultra-cold substance in the area of warm-air inflow to the tornado, in order to cause the tornado to take up the ultra-cold substance and cooled air, thus interfering with equilibrium that sustains the tornado, and
   wherein the ultra-cold substance is delivered to the area of ongoing tornadic activity by an airplane,
   and wherein the ultra-cold substance is released into the tornado directly from the airplane,
   and wherein the release is triggered by the break-up of the airplane.

2. A method of interrupting a tornado of the type, where rotation is sustained by the temperature differences at different altitudes, comprising the steps of:
   a. locating an area of ongoing tornadic activity; wherein the area of ongoing tornadic activity comprises at least one tornado, the tornado comprising a rotating tornado funnel,
   b. releasing an ultra-cold substance at low altitude in the area of ongoing tornadic activity,
   c. wherein the low-altitude is the altitude corresponding to a lower rotating portion of a particular tornado being targeted, and wherein the low-altitude is the altitude at which warm-air intake of a particular tornado being targeted is likely to occur,
   d. and wherein the ultra-cold substance is contained in a container and is released from the container by instantaneous breakup of the container,
   and wherein the area of ongoing tornadic activity comprises at least one tornado, the tornado comprising a rotating tornado funnel, and wherein
   the ultra-cold substance is released at low altitudes into the rotating tornado funnel,
   wherein the ultra-cold substance is delivered to the area of ongoing tornadic activity by an airplane, and
   wherein the airplane delivering the ultra-cold substance is a remotely-controlled drone, and wherein the airplane is guided into the tornado at low altitudes,
   and wherein the airplane disintegrates therein, thereby releasing the ultra-cold substance into the tornado.

3. The method of claim 2, wherein the ultra-cold substance is non-flammable,
   and wherein the airplane is powered by detachable gas tanks, said gas tanks detachably attached to the airplane and said tanks being detached prior to entering the area of ongoing tornadic activity.

* * * * *